United States Patent [19]
Rabatin

[11] Patent Number: 4,532,070
[45] Date of Patent: Jul. 30, 1985

[54] PROCESS FOR THE PREPARATION OF RARE EARTH OXYHALIDE PHOSPHOR
[75] Inventor: Jacob G. Rabatin, Montville, Ohio
[73] Assignee: General Electric Company, Schenectady, N.Y.
[21] Appl. No.: 691,322
[22] Filed: Jan. 14, 1985

Related U.S. Application Data

[63] Continuation-in-part of Ser. No. 483,335, Apr. 8, 1983, abandoned.

[51] Int. Cl.³ .............................................. C09K 11/475
[52] U.S. Cl. ........................... 252/301.4 H; 250/483.1
[58] Field of Search ............... 252/301.4 H; 250/483.1

[56] References Cited

U.S. PATENT DOCUMENTS

| Re. 28,592 | 10/1975 | Rabatin et al. | 252/301.4 H |
| 3,607,770 | 9/1971 | Rabatin | 252/301.4 H |
| 3,795,814 | 3/1974 | Rabatin | 252/301.4 H X |
| 4,054,798 | 10/1977 | Watanabe et al. | 252/301.4 H X |
| 4,315,979 | 2/1982 | Brines et al. | 252/301.4 H X |
| 4,478,933 | 10/1984 | Rabatin | 252/301.4 H X |

FOREIGN PATENT DOCUMENTS 2461260  7/1976  Fed. Rep. of Germany.

Primary Examiner—Jack Cooper
Attorney, Agent, or Firm—J. F. McDevitt; Philip L. Schlamp; Fred Jacob

[57] ABSTRACT

Rare earth oxyhalide phosphors activated with thulium ion and further incorporating scandium ion are described exhibiting improved optical resolution for the light image produced therefrom in X-ray image converter devices by reason of the particle size and shape of the phosphor crystals. A multilayer X-ray screen construction utilizing said phosphor material is also described exhibiting improved image sharpness attributable to said phosphor improvement. A preparation method is disclosed wherein the selected oxyhalide is recrystallized in a particular manner to produce phosphor crystals having a more polyhedral shape.

3 Claims, 1 Drawing Figure

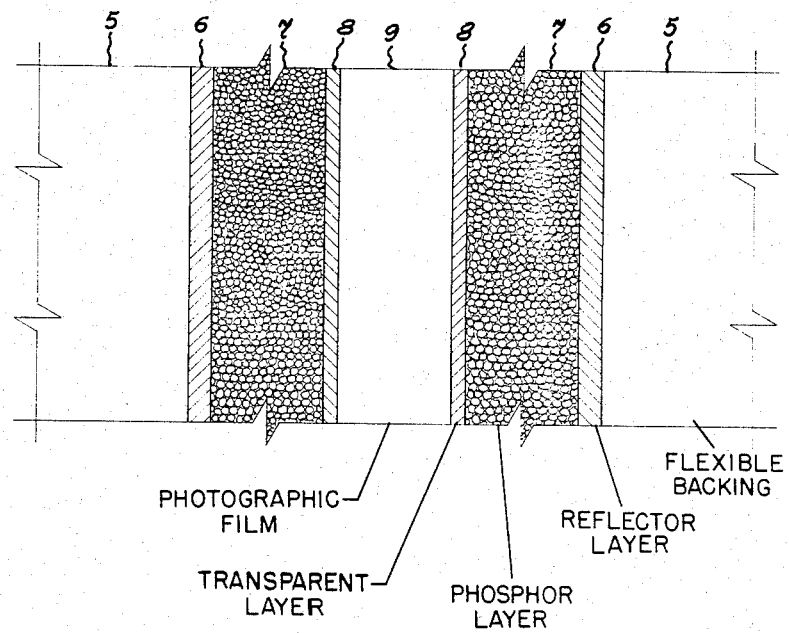

PROCESS FOR THE PREPARATION OF RARE EARTH OXYHALIDE PHOSPHOR

This application is a continuation-in-part of application Ser. No. 483,335, filed April 8, 1983, now abandoned.

RELATED APPLICATIONS

Patent application Ser. No. 691,323, filed concurrently herewith, is another continuation-in-part application of said aforementioned parent application as is also patent application Ser. No. 691,324, also filed concurrently herewith.

BACKGROUND OF THE INVENTION

The present invention pertains to preparation of particular rare earth oxyhalide phosphor materials activated with thulium exhibiting superior optical resolution for the light image produced therefrom when used in X-ray image converter devices. Conventional phosphors of this type still produce considerable loss in image resolution when the particle size of the phosphor crystals exceeds approximately 10 microns diameter and such overly coarse phosphor crystals are generally attributable to the method of phosphor preparation. It would be desirable, therefore, to provide an improved method to prepare these phosphor materials which produces still better shaped phosphor crystals of smaller particle size for resulting improvement in this product application.

Recrystallization is an already well recognized method of controlling the particle size of inorganic phosphor crystals. For rare earth oxyhalide phosphors, there is disclosed in U.S. Pat. No. 3,591,516 which is assigned to the assignee of the present invention, a method to produce well formed crystals of these oxyhalide materials by recrystallization in molten alkali metal halide fluxes but the particle size of the phosphor crystals is reported to exceed 10 microns diameter. Undesirable particle size increase for these thulium activated phosphors has now been discovered with decreasing activator level. More particularly, in my recently issued U.S. Pat. No. 4,478,933 there is disclosed a class of said rare-earth oxyhalide phosphors activated with thulium ion alone at a concentration in the range from about 0.0005 to 0.001 mole per mole of the phosphor which exhibits reduced crossover effects. Unfortunately, the average particle size range in said phosphor material has been found to exceed 10 microns diameter at the lower end of said activator range and with added difficulties being experienced in maintaining the particle size range at lower values by reducing the recrystallization temperatures. What has been discovered in lowering the recrystallization temperatures when preparing said phosphor material in molten alkali metal halide fluxes is that a greater variation occurs in the recrystallized phosphor particle size due to a variety of such factors as viscosity variation of the molten flux, localized temperature fluctuations, and still other undersirable effects.

In still another recently issued U.S. Pat. No. 4,315,979, also assigned to the present assignee, there is disclosed a recrystallization method for these phosphor materials using an alkali metal halide flux mixture whose halides correspond to the selected oxyhalide phosphor and carrying out said recrystallization at temperatures above the eutectic melting temperature of the flux mixture. In an alternate method of said phosphor preparation, the alkali metal carbonates of the selected alkali metal halides are added as starting materials before the initial heating step so that said alkali metal halides are formed in situ during said initial heating step. The phosphor crystals obtained in this manner are said to consist essentially of recrystallized phosphor crystals having an average median particle size range not below about 2 microns and not greater than about 16 microns for less light scattering and light absorption.

It would be desirable, therefore, to still further reduce the particle size and particle size distribution of this phosphor material during the phosphor preparation for improved optical resolution of X-ray image converters using this phosphor. It would also be desirable to do so in the manner not requiring elaborate modification of the phosphor preparation method now commonly used for superior X-ray image converter performance in other respects. It would be still further desirable to alter the shape of the individual phosphor particles during preparation as additional means to provide said improved performance.

SUMMARY OF THE INVENTION

A superior X-ray image converter is herein provided comprising well formed recrystallized phosphor crystals having the structural formula;

$$LnOX:Tm^{3+}, Z$$

wherein

Ln is one or more of La and Gd,

X is one or more of Br and Cl,

Tm is present as an activator at a concentration in the range from about 0.0005 to 0.01 mole per mole of the selected oxyhalide, Z is scandium ion which substitutes for Ln ion in an amount from about 0.001 up to approximately 0.2 mole per mole of phosphor, and with said recrystallized phosphor crystals having an average median particle size in the range extending from approximately 3.0 microns diameter up to approximately 9.0 microns diameter along with a more narrow particle size distribution. Preparation of said improved phosphor material can be obtained by heating a mixture of the rare earth oxides of the selected oxyhalide which further includes said thulium and scandium ion along with an ammonium halide whose halide is that of the selected oxyhalide for a time and temperature sufficient to form the selected oxyhalide phosphor and thereafter reheating the phosphor material with an alkali halide flux whose halide is again that of the selected oxyhalide to a temperature not exceeding approximately 900° C. for a time sufficient to recrystallize said selected oxyhalide phosphor. An alternate method of phosphor preparation mixes alkali metal carbonates whose halides are that of the selected oxyhalide with the starting materials before the initial heating step so that said alkali metal carbonates react with said ammonium halide to form an alkali halide flux mixture during the initial heating step.

In the present phosphor preparation, such utilization of scandium ion controls the particle size to a dramatic degree. Lower scandium ion levels than hereinbefore specified have not demonstrated this effect whereas a greater scandium level than specified has an adverse effect of reducing phosphor brightness. Since the scandium ion used in said phosphor preparation replaces part of the rare earth ion in the phosphor matrix there is achieved in said manner both a novel phosphor material together with a novel method for its preparation. In the former respect, it can be noted that the scandium level in the improved phosphor can considerably exceed the thulium activator level. In said latter respect, the scandium ion forms a relatively non-volatile halide in the molten alkali metal halide flux used in the phosphor recrystallization step. As above generally pointed out, said improved phosphor preparation requires heating a particulate oxide mixture selected from lanthanum and gadolinium oxides, including mixtures thereof, which further contains the thulium activator ion and ammonium halide whose halide ion is that of the selected oxyhalide along with sufficient scandium ion to produce a scandium level in said phosphor from about 0.001 to 0.2 mole per mole of the phosphor for a time and temperature sufficient to form the selected oxyhalide phosphor, and thereafter reheating said phosphor mixture with an alkali halide flux mixture whose halide ions are also that of the selected oxyhalide to a temperature not exceeding approximately 900° C. for a time sufficient to recrystallize said selected oxyhalide phosphor.

Preferred rare earth oxyhalide phosphor materials of the present invention having the above specified replacement scandium ion in the phosphor matrix at the specified concentration levels comprise lanthanum and gadolinium oxybromide activated with thulium ion again in the specified concentration range. including mixtures thereof. In a preferred embodiment for preparation of said thulium activated phosphor material, 378 grams of $La_2O_3:0.001Tm$ is dry blended with 0.10 gram $Sc_2O_3$, 14.0 grams $Li_2CO_3$, 10.0 grams $K_2CO_3$, and 334 grams $NH_4Br$ and the blended mixture next fired in a covered vessel at approximately 400° C. for about 2 and ½ hours to form the phosphor product. Said phosphor product is next blended and fired in a covered vessel for an additional 2 and ½ hours at appproximately 800° C. The recrystallized phosphor is finally washed free of water soluble salts after filtration and drying to produce a final product with the structural formula: $LaOBr:0.001Tm, 0.001Sc$. The particle size of said phosphor crystals, as measured by Coulter Counter instrument, was found to be an average median particle size (APD) of approximately 3.7 microns diameter.

Surprisingly, further observation of said phosphor crystals found the effect of the replacement metal ion to be retardation of crystal growth in the fastest crystal growth direction and which resulted in crystals having a still greater thickness than reported in the above mentioned U.S. Pat. No. 4,315,979. Such a thickness increase in the now generally smaller size and more polyhedral shaped phosphor crystals reduces the various optical resolution difficulties which are explained in said aforementioned patent as attributable to the flat plate like phosphor crystals therein obtained. Thus, not only is there experienced greater optical resolution attributable to the smaller particle size of the presently improved phosphor crystals but less light scattering as well. Said latter improvement reduces the light crossover problem still being encountered in X-ray image converter devices using the conventionally shaped phosphor crystals.

In the preferred X-ray screen constructions, the modified phosphors of the present invention are employed as a pair of phosphor layers which are positioned on each side of a double emulsion photographic film to form a sandwich configuration. The preferred multi layer X-ray screen further incorporates a UV absorption dye in the otherwise transparent layer of the photographic film member to cooperate with the present phosphor materials in reducing the amount of emitted radiation which can crossover to the more remote emulsion layer. Crossover widens the recorded image and produces blurring due to lack of alignment between the image formed on the nearest emulsion layer and the crossover image produced the more remote emulsion layer. Understandably, the present modified phosphors produce a light image having better optical resolution when recorded upon the associated photograpic film due to improved size and form of these more polyhedral shaped phosphor crystals.

BRIEF DESCRIPTION OF THE DRAWING

In the accompanying drawing there is shown a cross sectional view of a multi layer X-ray screen utilizing the present modified phosphor materials along with a dye system to absorb ultraviolet light which otherwise crosses over to the remote emulsion layer.

DESCRIPTION OF THE PREFERRED EMBODIMENTS

Said accompanying drawing depicts a double emulsion photographic film 9 which is sandwiched between two X-ray intensifying screens. The screens are constructed in a conventional manner with a flexible backing 5 which supports a pair of reflecting layers 6, a pair of phosphor layers 7 to which this invention relates and a pair of transparent layers 8. It is to be pointed out that the particular construction of said X-ray screen member is merely exemplary and thereby is not intended to be a limitation on the invention which resides in the modified phosphor material improving the overall device performance. Accordingly, there is provided in Table 1 below representative examples evidencing control of phosphor particle size by the level of scandium replacement ion ion incorporated into the phosphor matrix according to the present invention. The particular phosphor being modified ($LaOBr:0.001Tm$) was prepared in the same manner previously described to include the scandium concentrations listed in said Table along with the respective ionic radius value for said replacement metal ion.

TABLE 1

| Example | Metal Ion (Mole/Mole Phosphor) | Coulter APD (Microns) | Ionic Radius (Angstroms) |
|---|---|---|---|
| 1 | None | 9.6 | — |
| 2 | .001 Scandium | 3.7 | .73 |
| 3 | .002 Scandium | 2.8 | .73 |

It can be noted from said reported particle size values in examples 2 and 3 that increasing the level of replacement scandium ion in the phosphor matrix produces greater reduction in the phosphor particle size. That a greater degree of uniformity in particle size can be achieved with the present method of preparation is evidenced with test results wherein the particle size was maintained between 4 microns diameter and 8 microns diameter. From said results it seem further evident that such relatively modest modification in the phosphor matrix produces a pronounced effect upon both particle size and shape in the recrystallized phosphor product.

It will be apparent from the foregoing description that novel phosphor materials and X-ray image converter devices utilizing said phosphor materials have been disclosed exhibiting significant performance improvement. It should be appreciated from said foregoing description, however, that comparable phosphors can be prepared having compositions other than above specifically disclosed in the same manner. Additionally, other recrystallization flux mixtures disclosed in the aforementioned U.S. Pat. No. 4,315,979 are contemplated to produce still further performance improvement in the particle size and shape of these recrystallized phosphor crystals. It is intended to limit the present invention, therefore, only by the scope of the following claims.

What I claim is new and desire to secure by Letters and Patents of the United States is:

1. A process for the preparation of lanthanum and gadolinium oxyhalide phosphor crystals selected from the group consisting of oxychlorides and oxybromides activated with thulium ion consisting essentially of recrystallized phosphor crystals having an average median particle size in the range extending from approximately 3.0 microns diameter up to approximately 9.0 microns diameter along with a more narrow particle size distribution and polyhedral shape comprising the following steps:
   (a) heating a mixture of particles of oxides selected from lanthanum and gadolinium oxides, including mixtures thereof, which further contains thulium ion in activator amounts from about 0.0005 to 0.01 mole per mole of the phosphor and an ammonium halide whose halide ion is that of the selected oxyhalide, along with sufficient scandium ion to produce a scandium level in said phosphor from about 0.001 to 0.2 mole per mole of the phosphor for a time and temperature sufficient to form the selected oxyhalide phosphor, and
   (b) reheating said phosphor with an alkali metal halide flux mixture whose halide ions are that of the selected oxyhalide phosphor to a temperature not exceeding approximately 900° C. for a time sufficient to recrystallize said selected oxyhalide phosphor.

2. A process as in claim 1 wherein at least one alkali metal carbonate is included in the mixture employed in step (a) so that said alkali metal carbonate reacts with said ammonium halide to form one of the selected alkali metal halides of the flux mixture in the initial heating step.

3. A process as in claim 1 wherein the scandium ion forms a relatively non-volatile halide in the alkali metal halide flux mixture.

* * * * *